(12) United States Patent
Hollub et al.

(10) Patent No.: US 7,096,894 B1
(45) Date of Patent: *Aug. 29, 2006

(54) APPARATUS AND METHOD FOR REMOVING AND REPLACING VEHICLE SYSTEM FLUID

(75) Inventors: Peter C. Hollub, Huntington Beach, CA (US); Joseph D. Lentini, Tustin, CA (US)

(73) Assignee: Environmental Brake Services, Huntington Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/929,983

(22) Filed: Dec. 14, 2004

Related U.S. Application Data (63) Continuation of application No. 10/626,332, filed on Jul. 24, 2003, now Pat. No. 6,830,083.

(60) Provisional application No. 60/398,490, filed on Jul. 24, 2002.

(51) Int. Cl.
*B65B 1/04* (2006.01)

(52) U.S. Cl. .............................. 141/65; 141/59; 141/94; 184/1.5; 700/244

(58) Field of Classification Search ................. 141/65, 141/59, 94, 98; 184/1.5; 222/154; 700/231, 700/244
See application file for complete search history.

(56) References Cited

U.S. PATENT DOCUMENTS

| | | |
|---|---|---|
| 5,359,522 A | 10/1994 | Ryan |
| 5,586,583 A | 12/1996 | Edwards et al. |
| 6,045,040 A | 4/2000 | Streicher et al. |
| 6,330,934 B1 | 12/2001 | Viken |
| 6,585,009 B1 | 7/2003 | Matthews et al. |

*Primary Examiner*—Steven O. Douglas
(74) *Attorney, Agent, or Firm*—Blakely Sokoloff Taylor & Zafman LLP (57) ABSTRACT

A hydraulic flushing system includes an indicia reader adapted to read indicia on a hydraulic fluid container and a data processor coupled to the indicia reader to determine if the indicia has been utilized before in the hydraulic flushing system. The hydraulic flushing system may include a pump to pump hydraulic fluid from the container. The data processor may prevent operation of the pump if the indicia has been utilized before in the hydraulic flushing system or if the indicia does not indicate a proper grade of hydraulic fluid for a type of vehicle being serviced.

18 Claims, 6 Drawing Sheets

| START | INITIALIZE SYSTEMS |
|---|---|
| RESET | TURN SYSTEM ON, ENABLE COMMANDS, RESET TO PREVIOUS STATUS |
| (F1) M/C CLEAN OUT | OPERATE PUMPS TO DRAIN M/C |
| (F2) M/C FILL | OPERATE PUMPS TO PROVIDE FLUID TO M/C |
| (F3) FLUID EXCHANGE | OPERATE PUMPS TO PROVIDE SURGING PRESSURE |
| (F4) UTILITY | (F1) EMPTY WASTE<br>(F2) SYSTEM PRIME |
| READ | READ BARCODE, PROVIDE MESSAGE |

*FIG. 13*

|  | 117 | 112 | 119 | PUMP 110 | PUMP 115 | PUMP 120 |
|---|---|---|---|---|---|---|
| F1 | closed | closed | closed | off | on | off |
| F2 | closed | closed | closed | on | off | off |
| F3 | open | closed | closed | on | on | off |
| Pressure Reduction after F2 or F3 | closed | open | open | off | on | off |
| Empty container after F3 | closed | closed | open | off | on | off |
| Empty waste | closed | closed | closed | off | off | on |

*FIG. 14*

APPARATUS AND METHOD FOR REMOVING AND REPLACING VEHICLE SYSTEM FLUID

CROSS REFERENCE TO RELATED APPLICATIONS

This application is a continuation of U.S. patent application Ser. No. 10/626,332, filed Jul. 24, 2003 now U.S. Pat. No. 6,830,083, which claims the benefit of U.S. Provisional Application No. 60/398,490, filed on Jul. 24, 2002.

FIELD OF INVENTION

The present invention relates to fluent material handling and more specifically to an apparatus and method for removing and replacing fluid in a system in a vehicle.

BACKGROUND OF THE INVENTION

Vehicles utilize a number of fluid systems to operate components. A significant vehicular fluid system is a hydraulic brake system in which force applied to a brake pedal is amplified and transmitted to brake drums or disks via a hydraulic system. Therefore, the present invention will be discussed in the context of a hydraulic automotive brake system but is not so limited. Other automotive fluid systems include, for example, power steering, oil, and automatic transmission systems.

The basic functions performed by a system for removing and replacing vehicle hydraulic fluid include removing old hydraulic fluid from a master cylinder, vacuuming out old fluid through bleeder valves, refilling the brake fluid lines and master cylinder while keeping moisture and other contaminants from entering the new fluid and keeping air out of the brake fluid lines. The old fluid must be delivered to a suitable waste container. Such functions have been performed by prior art system.

Prior systems, however, do not address considerations that have become more significant in view of the increasing sophistication of brake fluid and brake systems, federal regulations, and quality assurance. It is desirable to have a hydraulic fluid changing apparatus that can require that input information is provided to assure that the container of brake fluid being utilized is appropriate for use. It is desirable to assure that the container from which the brake fluid is drawn has not been refilled and reused. This can prevent the use of counterfeit, contaminated, or inappropriate products. The United States Department of Transportation has established grades such as DOT 3, DOT 4, DOT 5, and DOT 5.1. Each has a different formula and characteristics. DOT 3 fluid is the least expensive grade, most widely available and most widely used. DOT 4 fluid is more expensive. DOT 4 fluid has a higher boiling point making it more suitable for high-performance applications such as Automatic Brake Systems (ABS). Capacity to recognize that the appropriate fluid is being used in a particular car is a desirable capability.

While prior systems have accounted for proper disposal of used brake fluid, disposal of remaining new, clean brake fluid has not been addressed. However, clean brake fluid is a hazardous material in terms of disposal regulations just as well as used brake fluid. It is further desirable to provide a system that communicates many different conditions to a service technician to maximize ease of use of the apparatus and minimize improper handling of new or used hydraulic fluid.

SUMMARY OF THE INVENTION

Briefly stated, in accordance with the present invention, there are provided a method and apparatus for removing and replacing fluid in a vehicle fluid system in which a fluid container is modular with respect to an apparatus including pump means for evacuating old fluid from the system and pumping new fluid into a system. An adapter is used to interface fluid from the apparatus to the vehicle fluid system to maintain a closed fluid system. Consequently, contaminants are prevented from entering the vehicle fluid system. The apparatus includes a reader to read indicia on a container of new fluid. The indicia may, for example, comprise a bar code. The apparatus is provided with a memory and information indicative of approved indicia so that the contents of the container will not be dispensed by the apparatus unless an approval was generated in response to reading the indicia.

In a preferred form, basic functions such as draining a master cylinder of old fluid and emptying waste from the apparatus are performable without an approval. The modular container is attached to the apparatus so that contents are drawn therefrom without waste or spillage. The container is preferably received in a protected enclosure. The apparatus preferably provides to a technician utilizing the system condition-indicative information, for example, an indication when the fluid in the container has been emptied. Also, at the completion of filling the closed system, pressure in the system cylinder fill line is reduced when service is interrupted or completed. The apparatus also contains a waste tank for receiving drained fluid, and can also empty an incompletely used clean container into the waste tank. A specific pump empties the waste fluid from the waste tank to an external disposal vessel. The apparatus also controls times and operating parameters of ongoing operations.

BRIEF DESCRIPTION OF THE DRAWINGS

The invention, both as to its organization and manner of operation, is explained with respect to the following drawings. Of the drawings.

DETAILED DESCRIPTION OF THE INVENTION

Figures 1, 2, 3:
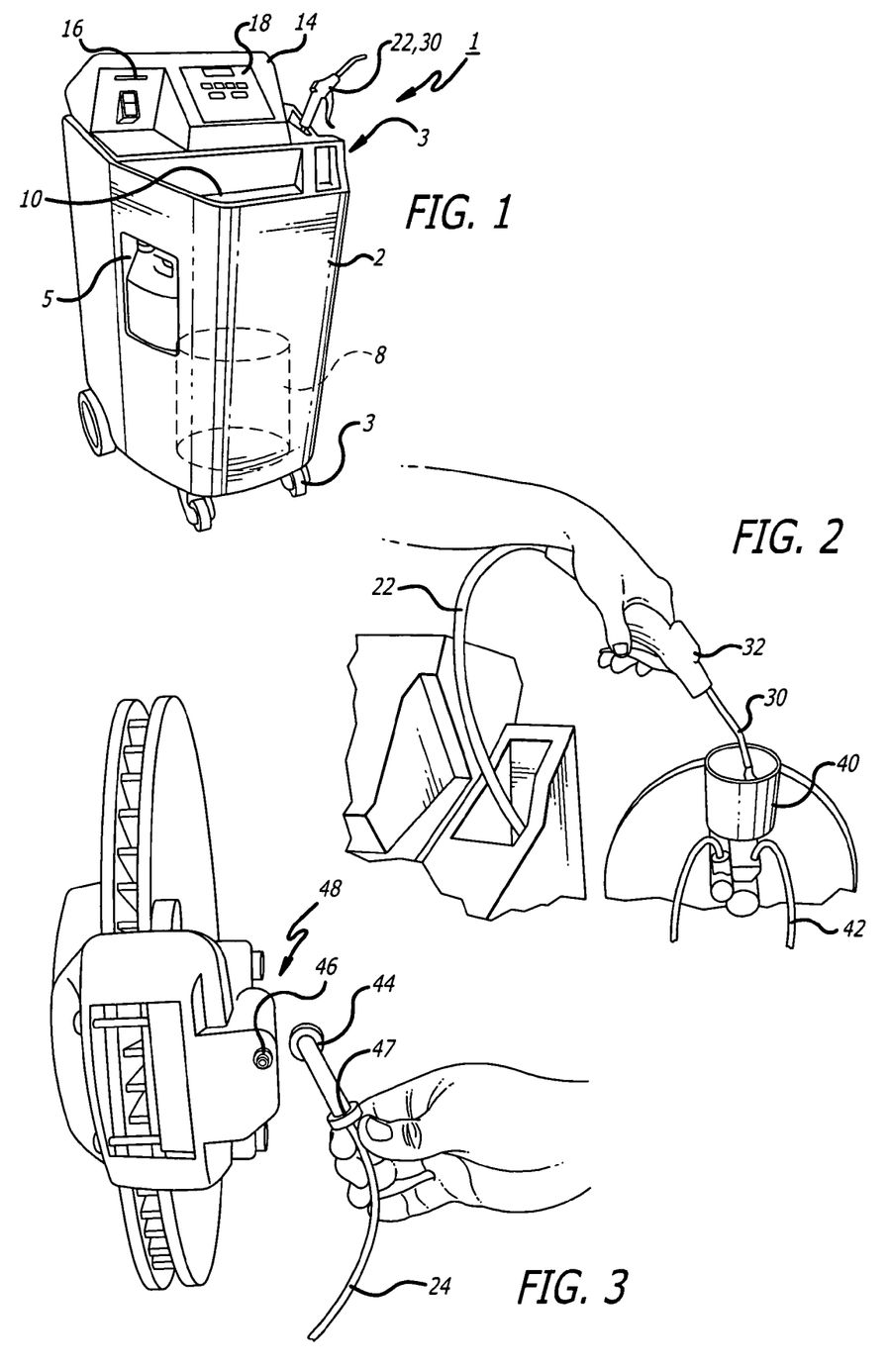
FIG. 1 is a perspective view of a hydraulic fluid handling apparatus constructed in accordance with the present invention.
FIG. 2 is a partial, perspective view of the apparatus of FIG. 1 utilized to remove hydraulic fluid from a reservoir of a vehicle hydraulic system.
FIG. 3 is an axonometric view of a vacuum hose and bleeder valve fitting connected to vacuum fluid being flushed and bled from a vehicle hydraulic system.

FIG. 1 is a perspective illustration of a fluid handling apparatus 1 incorporating the present invention. The invention is discussed in the context of a hydraulic brake fluid system, since that is an important application. However, the invention is not so limited. The apparatus 1 comprises a body 2 preferably mounted on transport means 3. It is desirable to have portability of the apparatus 1 in a maintenance shop. The body 2 may take any number of suitable shapes. In the present embodiment, the body 2 is generally barrel-shaped and vertically disposed. In the present embodiment, the envelope of the barrel is based on a portable 56-gallon barrel. By using the basic envelope, a widely used consumer and industrial product, cost, design, and manufacture are reduced due to the reduced need for custom design. The apparatus 1 could alternatively have the body 2 shaped as a tool or instrumentation cabinet as in various prior art embodiments. Many other shapes can be used.

The body 2 has a top area 3 including a recessed tray 10 which may receive tools. The recessed tray 10 is a forward horizontal half of the top area 3. The rear horizontal half of the top 3 comprises a console 14. A recessed enclosure 5 is formed, preferably in a side wall of the body 5 and is further described below. The console 14 comprises an indicia reader 16 and a data display and entry unit 18. The reader 16 and data unit 18 are further described with respect to FIGS. 6 and 13 below.

A number of hydraulic lines, each with a connector are also provided. The apparatus 1 includes a vacuum hose 22, four bleeder valve hoses 24a, 24b, 24c, and 24d, collectively the hoses 24, and a fill hose 26 (see also FIG. 10). As seen in FIG. 1 and in greater detail in FIG. 2, the vacuum hose 22 terminates in a vacuum wand 30 projecting from a hand piece 32. The vacuum wand 30 is used to withdraw hydraulic fluid from a reservoir 40 such as a master cylinder 40 of a vehicle 42. One of the bleeder valve hoses 24 is illustrated in FIG. 3 as well as FIG. 10. The bleeder valve hose 24 is terminated in a fitting 44 for engaging a bleeder valve 46 in a brake assembly 48 of the vehicle 42. Each fitting 44 also comprises a check valve 47 to prevent back flow when the fittings 44 are not attached to the bleeder valves 46 of the hydraulic system of the vehicle 42.

Figure 4:
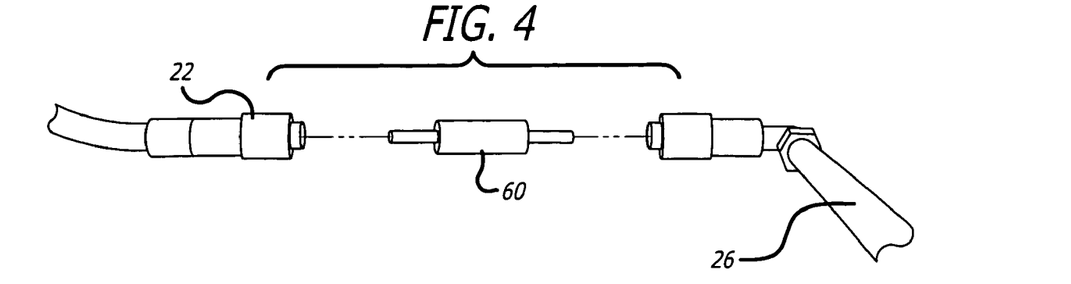
FIG. 4 is a plan view of a priming tool used in conjunction with a hydraulic line from the hydraulic fluid handling apparatus.

FIG. 4 illustrates means to prime a pump in the hydraulic system (discussed with respect to FIG. 10 below) of the apparatus 2. A prime tool 60 is provided for connection to the vacuum hose 22. To use the vacuum hose 22 for priming, the handpiece 32 is detached therefrom. The priming tool 60 is attached to the vacuum hose 22, and the appropriate pump through fill hose 26 to be primed is coupled to the hose 22. The fill hose 26 is illustrated in greater detail in FIG. 5 as well as FIG. 1. The fill hose 26 is coupled to a master cylinder adapter 66. The master cylinder adapter 66 includes a fitting 64 to interface with input means to the master cylinder 68. Normally, master cylinders have caps with no aperture which would permit the flow of hydraulic fluid therethrough. Therefore, an adapter is provided to allow removal of the master cylinder cover (not shown) and cover the master cylinder with a cover 67 including an input valve 64 for hydraulic fluid. In the present illustration, an adapter is provided constructed in accordance with co-pending, commonly assigned patent application Ser. No. 10/417,281, the disclosure of which is incorporated herein by reference. Other forms of adapters may be provided.

Figure 6:
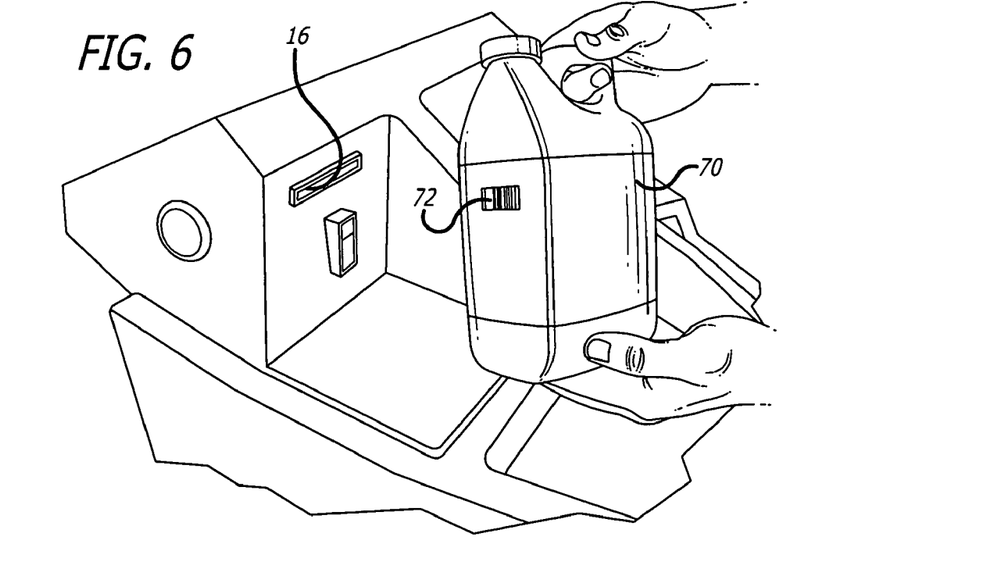
FIG. 6 is a partial, detailed view of the apparatus of FIG. 1 illustrating a reader and also illustrating a hydraulic fluid container with indicia thereon.

The reader 16, in addition to being illustrated in FIG. 1, is illustrated in FIG. 6 along with a hydraulic fluid container 70 bearing indicia 72. In the present illustration, the indicia 72 comprises a bar code and the reader 16 comprises a bar code reader. While the bar code is a highly convenient method to use in view of current technologies, other forms of indicia may be provided. For example, the indicia 72 could comprise a radio frequency ID tag (RFID) and the reader 16 could comprise a radio frequency source. Many other forms of indicia are well-known and indicia to be developed in the future could also be utilized. The indicia 72, in the preferred form, is unique for each container 70. Software further described with respect to FIGS. 11–13 may identify a range of authorized identities for various indicia 72. The system also remembers which indicia 72 it has read. In this manner, it is possible to prevent reuse of a container 70. A reused container 70 could be refilled with inappropriate or contaminated hydraulic fluid. Prohibiting reuse of a specific container greatly discourages use of other than the new, appropriate contents of the container 70 and contributes to assuring safe operation of the hydraulic system of the vehicle 42.

In the preferred form, the container 70 cooperates in a system with the apparatus 1. This system permits a garage or other user to enjoy convenience and efficiency in use. In the preferred form, the container 70 is proportioned to fit within the enclosure 5.

Figure 7:
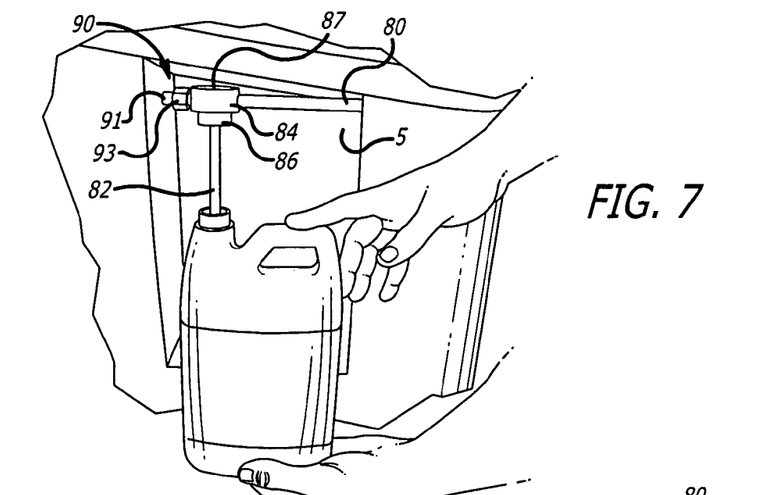
FIG. 7 is a partial view of the apparatus of FIG. 1 illustrating coupling means to interface the hydraulic fluid container to a hydraulic system of the hydraulic fluid handling apparatus.
Figure 8:
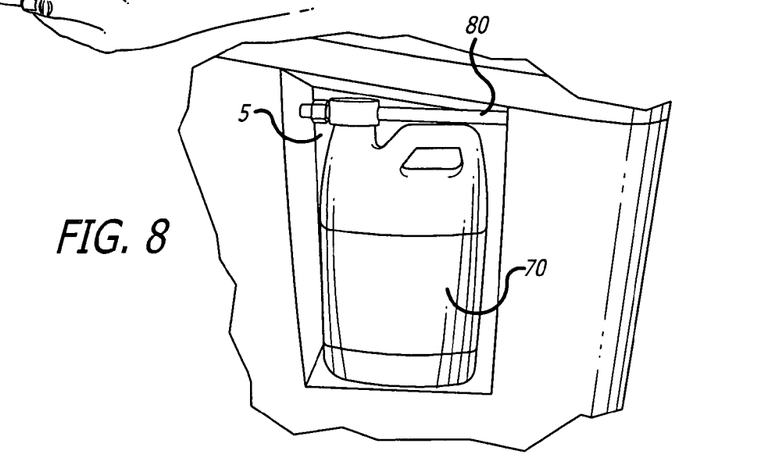
FIG. 8 is a partial view of FIG. 1 illustrating the container hydraulically coupled to the system and supported in a protected enclosure.

The interaction of the container 70 and apparatus 1 is further illustrated with respect to FIGS. 7 and 8, which are partial views of the apparatus 1. The apparatus 1 has an input line 91 delivering hydraulic fluid from the container 70 to the hydraulic circuit illustrated in FIG. 10. The input line 91 and support axle 80 support an intake tube 82. The intake tube 82 is dimensioned to reach substantially to the bottom of the container 70 when the container 70 is housed in the enclosure 5. In one form, the intake tube 91 is coupled to the input line by an adapter 84. The adapter 84 comprises an elbow fitting receiving an upper end of the input tube 82 and coupling it to the intake tube 91. The adapter 84 serves to seal the opening 71 of the container 70. To this end, a plug 86 unitarily formed with the adapter 84 is provided with a dimension to seal the opening 71 of the container 70. The dimension of the container 70 interacts with the dimension of the enclosure 5 so that the opening 71 is properly sealed by the plug 86 when the container 70 is fit into the enclosure 5. A supporting portion 87 of the adapter 84 surrounds the end input tube 91 so that it can rotate around the input tube 91 while maintaining a seal. Consequently, the intake tube 82 can be lifted out of the enclosure 5 by rotating about the input tube 91 and axle 50. Then the container 70 may be slid up along the intake tube and the opening 71 sealed onto the plug 86. Then the resulting assembly may be pressed into the enclosure 5. The top 87 rotates around the tube 82 permit this operation. Spacer means 90 firmly brace the adapter 84 against a vertical wall of the enclosure 5 away from the direction of the input tube 91 and axle 80. The bracing means 80 may comprise a threaded tube 94 which may be rotated to vary its extension from the adapter 84 and which is held in place by a stop nut 93.

Figure 9:
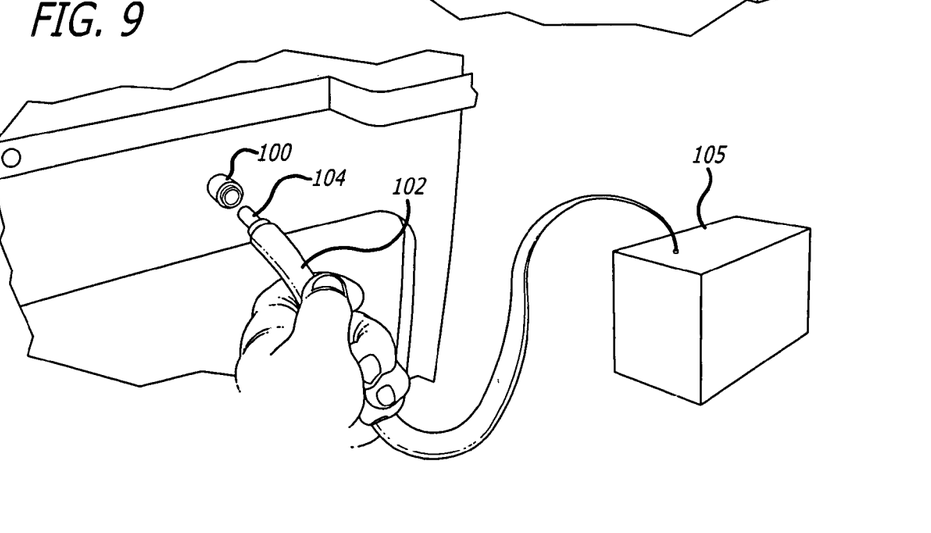
FIG. 9 is a partial view of the apparatus of FIG. 1 illustrating a drain port coupling the expended fluid reservoir to a disposal vessel.

FIG. 9 illustrates a fitting 100 communicating with the waste tank 8 (FIG. 1). The fitting 100 provides for removal of waste fluid from the waste reservoir 8. To achieve removal, an exhaust hose 102 is coupled to the outlet fitting 100 by a hose fitting 104. The exhaust hose 102 is coupled to a waste container 105 as further described with respect to FIG. 10 below. The containers 05 may be an intermediate container, a tank on a vehicle which will transport waste fluid to an authorized disposal center, or other container.

Figure 10:
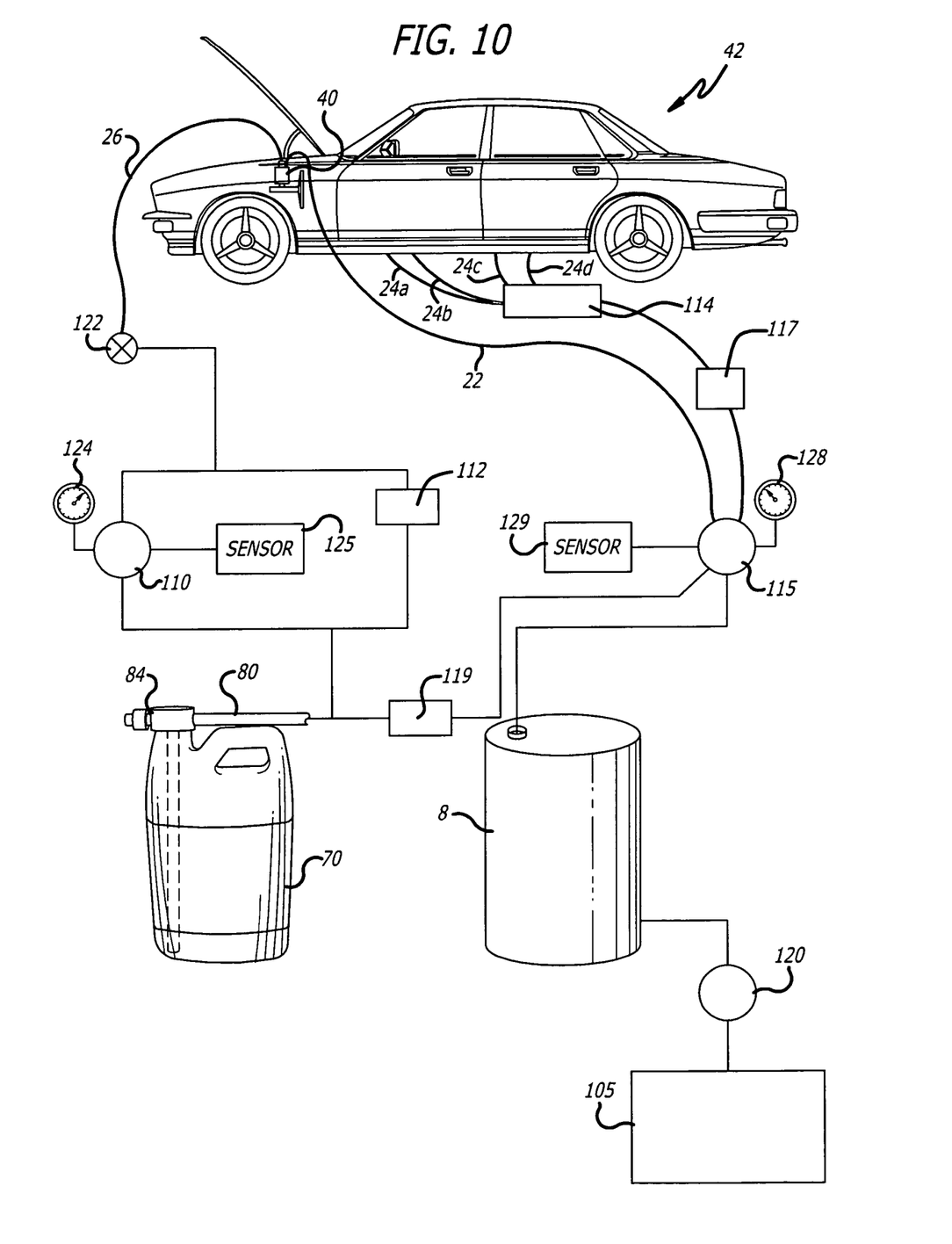
FIG. 10 is a hydraulic schematic diagram of the present apparatus interconnected with a vehicle hydraulic system.

FIG. 10 is a hydraulic schematic diagram of a system in which the present invention operates. These same reference numerals are used to denote items described above. The hydraulic system includes a pump 110 for pumping fresh hydraulic fluid from the container 70 to the vehicle 40. A solenoid valve 112 is connected in a line across the pump 110 for selective activation as described below. The solenoid valve 112 when on bypasses the pump 110 and relieves pump pressure.

A pump 115 provides the suction for drawing fluid into the line 22 and the bleed valve lines 24. The pump 115 exhausts to the waste container 8. A manifold 114 is intermediate the bleed lines 24 and the pump 115. A solenoid valve 117, when on connects the fluid path from the manifold 114 to the pump 115. A solenoid valve 119 is provided for selectively connecting, when on, the container 70 to the pump 115 for exhaust to the waste container 8. A separate pump 120 is used to pump exhausted hydraulic fluid out of the waste container 8.

The pump 110 is connected between the intake line 80 and the hydraulic fluid supply line 26. A shut-off valve 122 may be connected between the pump 110 and the hydraulic fluid reservoir 40 on the vehicle 42. In the particular example illustrated, the shut-off valve 122 is incorporated in the adapter 50 (FIG. 4). The shut-off valve 122 in this example comprises an air vent valve (not shown) inside the adapter 50 responding to level of hydraulic fluid in the reservoir 40. However, many forms of shut-off valve are well-known in the art. For example, a pressure sensitive valve could be used in a hydraulic line exterior to the reservoir 40.

A pressure gauge 124 may be coupled to the pump 110 to provide an indication of pressure, and a pressure sensor 125 may be hydraulically connected to the pump 110 to produce a signal for use by condition-responsive apparatus. In a preferred form, a fluid line from an outlet of the pump 110 goes into a transducer (not shown) providing an output to a computer 158 (FIG. 11).

The pump 115 is coupled to remote ends of the line 22 and lines 24a–d. The pump 115 is connected to pump hydraulic fluid to the waste tank 8. A pressure gauge 128 may be connected to the pump 115 to provide an indication of pressure to a user and a sensor 129 may be connected hydraulically to the pump 115 to produce a signal for use by condition-responsive apparatus. Providing a specific pump for emptying the waste hydraulic fluid from the waste tank 8 provides operating advantages. The pump 115 may be larger than other pumps. It will pump faster. Larger chambers in the pump 115 can pass large contamination particles. Use of a separate pump costs less than utilizing additional conduits and solenoids to use another pump, e.g. pump 110, to reroute the waste fluid.

Figures 11, 12:
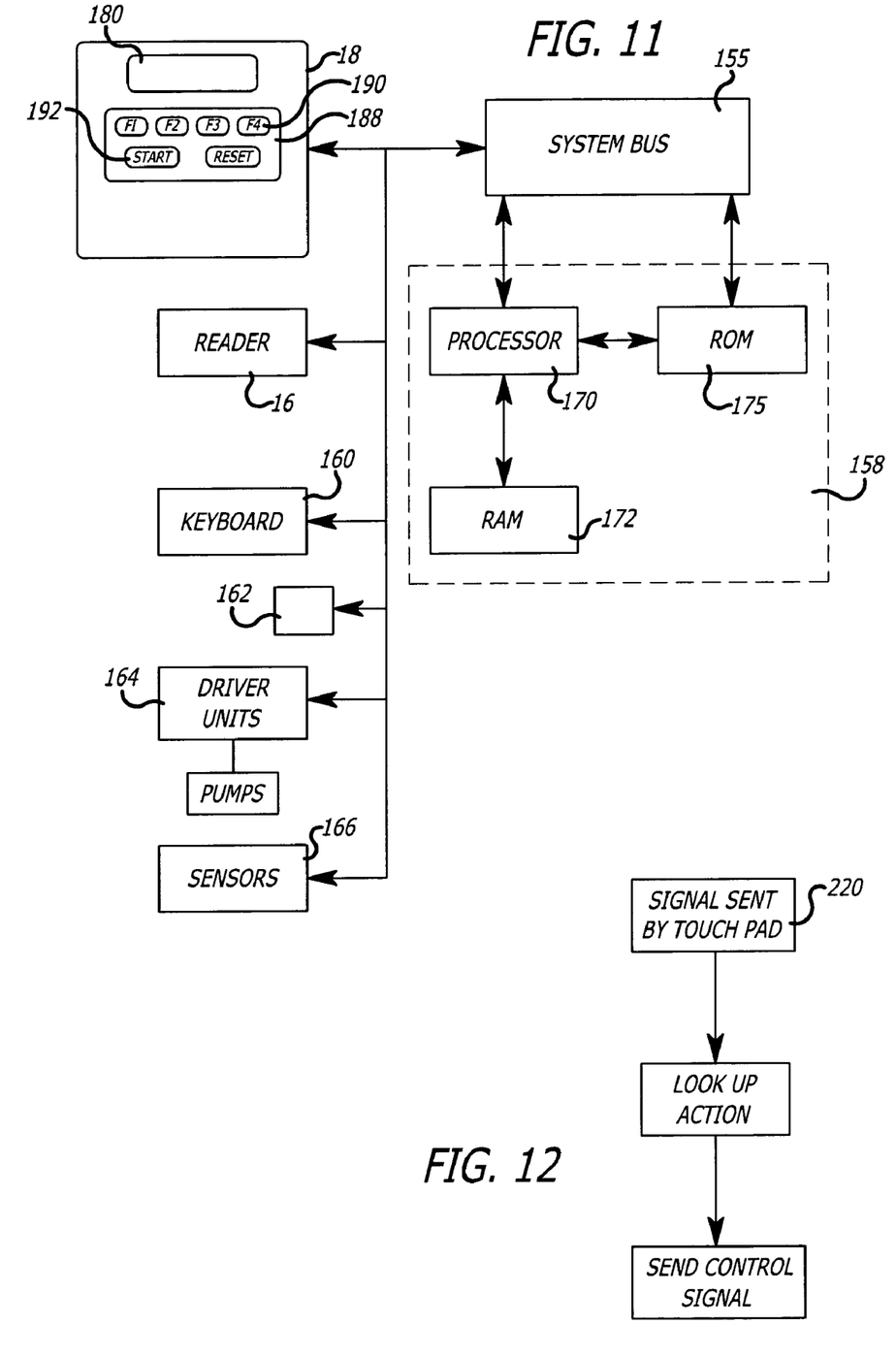
FIG. 11 is a block diagrammatic representation of the data processing system included in the hydraulic fluid handling apparatus.
FIG. 12 is a flow diagram illustrating operation of selected functions.

FIG. 11 is a block diagram of data processing means and electronics and the apparatus of FIG. 1. A plurality of devices interact over a system bus 155 with a computer 158. The devices include the reader 16 and data entry and display unit 18. If desired, a data entry means such as a keyboard 160 may be provided. A display 162 could also be used to provide graphical information other than the simplified display provided in the display and input unit 18 in the present example. A driver circuit 164 interprets outputs of the computer 158 in order to drive the pumps 110, 115 and 120 (FIG. 10). A sensor unit 166 may be used to provide condition-responsive capability to the apparatus 1 and may comprise a plurality of sensors. Sensors may include, for example, the pressure sensors 125 and 129 (FIG. 10). The computer 158 comprises a processor 170 communicating with the system bus 155 and also communicating with a random access memory 172. The computer 170 may further comprise a read only memory (ROM) 175 which will embody programs as further described below.

The data entry and display unit 18 is described in greater detail. Many different forms of display and data units 18 could be provided. The selection of particular features is a matter of optimization with respect to criterion a user may select. In the unit 18 of the present example, the selection of features is optimized for low cost and high power in permitting a user to perform all tasks simply and reliably. A liquid crystal display 180 provides alphanumeric information indicative of various operations. Input information is provided from a switch panel 188 having an upper surface sealing switches from the outside environment. Switches 190 are in registration with touch pads 192. In the present example, the touch pads 192 are indicated by the areas labeled F1, F2, F3, F4, Start, and Reset. Depression of one of the touch pads 192 may directly trigger an option or may access a menu for further options. This is further explained with respect to FIG. 13 below.

Performance of a function is illustrated in FIG. 12, which is a flow diagram. At box 220, a function is selected by depressing one of the touch pads 192. This action initiates creation of a signal sent to the system bus 155 for processing in the computer 158. The processor in effect looks up an action to be performed in response to the command, performs necessary computations in accordance with programs and sends a control signal via the system bus 155 to perform indicated actions.

Figure 13:
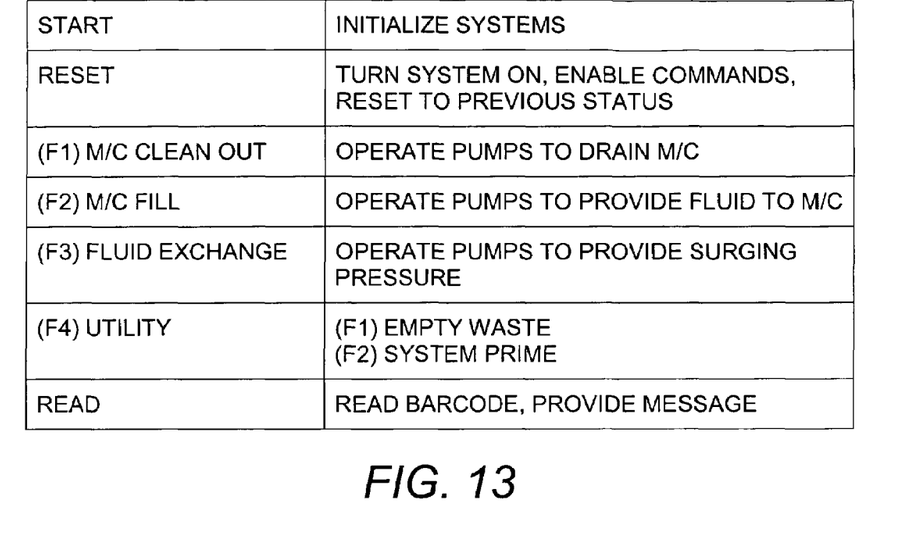
FIG. 13 is a chart useful in conjunction with FIGS. 2 and 11 to further describe operations performed in response to execution of the functions specific in FIG. 12.

The programming of the apparatus 1 is illustrated in FIG. 13 which is a chart illustrating the programming utilized by the computer 158. Each row represents a different command. The first column represents the name of the command. The second column indicates a response to the command and further responses are indicated as necessary. Depression of the touch pad 192 Start pad initializes systems. The touch pad 192 Reset pad will issue a command to cause the computer to reset the system to its previous status prior to a command's being reset. Touch pad 192 F1 pad is set to command master cylinder (MC) clean-out and initiates production of a signal supplied to the driver circuit 164 for operating the pump 15 (FIG. 10) to drain the master cylinder 40 via the line 22. Operation of the touch pad 192 F2 pad will provide a signal to the processor to initiate production of a control signal to the driver circuit 164 for operating the pump 110 to provide fluid to the master cylinder 40. The touch pad 192 F3 pad will initiate an operation called fluid exchange and will cause the processor to issue control signals to the driver circuit 164 to provide surging pressure at the master cylinder 40 in response to operation of the pump 110 and vacuum at all four bleeder valves 44 (FIG. 3) by operation of the pump 115.

Operation of the touch pad 192 F4 pad will initiate a routine called utility in which new functions are temporarily assigned to the F1 pad and the F2 pad for purposes of this operation. The F1 pad is given the temporary value of empty waste and the F2 pad is given the temporary value of system prime. Depression of the F4 pad followed by the F1 pad will cause the processor to produce a signal provided to the driver circuit 164 for operating the pump 120 for emptying waste from the waste tank 8. Depressing the F4 pad followed by the F2 pad will enable the system to perform a system prime.

In the present example, the reader 16 is enabled at start, and no touch pads 192 need be pressed to operate the reader. The reader needs to be provided with a stimulus to which it can respond. Such a stimulus is passing a barcode label 72 (FIG. 6) in operating range of the reader 16. The reader 16 sends its intelligence to the processor 170 which will then look up the bar code and see if this bar code has been utilized before in the system. The processor may access other information stored in conjunction with the bar code. For example, the processor could receive an input indicative of the type of car being serviced and look up the grade of hydraulic fluid required. The bar code 72 may include intelligence indicative of the grade of hydraulic fluid, and the processor 170 may compare the grade of the hydraulic fluid to the grade accessed by the look-up step. Then, a message is coupled by the system bus 155 to the display 180 may provide messages such as "not approved" to indicate that the container is not an appropriate container for use. If the container is suitable for use, the display 180 may provide messages such as "insert appropriate canister and press start button." In response to this instruction, a user would place the suitable container 70 in the enclosure 16. The processor may prevent hydraulic flushing operations until a suitable hydraulic fluid container 70 has been identified by reading the indicia 72 on the container. The processor may require that a suitable hydraulic fluid container 70 be identified by reading the indicia 72 on the container prior to each hydraulic flushing operation.

Figure 14:
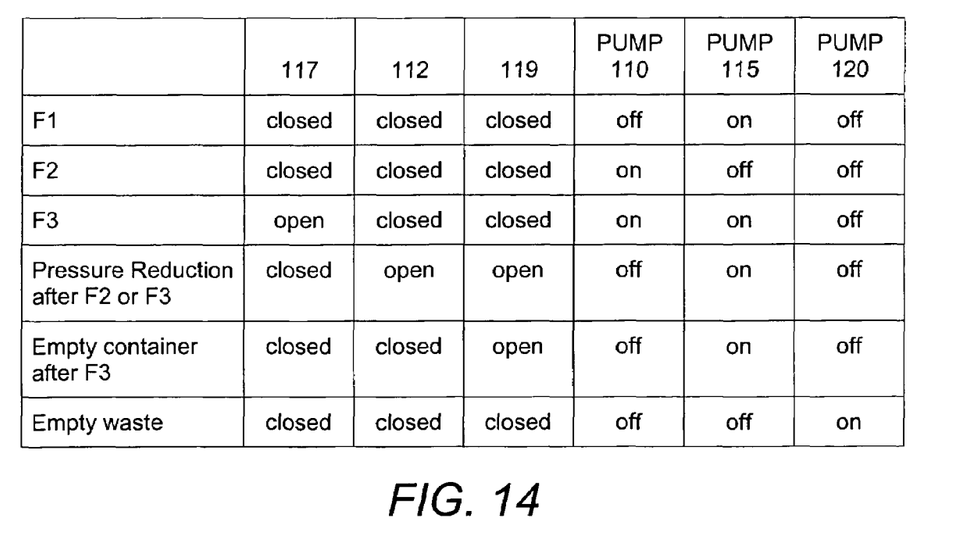
FIG. 14 is a state diagram for each pump and solenoid valve of FIG. 10 for each operation.

Operation is described primarily with respect to FIGS. 1, 10, 11 and 14. FIG. 14 is a state diagram for each pump and solenoid valve of FIG. 10 for each operation. In operation, a user will press the touch pad 192 F1 pad to initiate master cylinder 40 cleanout. The user will insert the wand 30 (FIG. 2) into the master cylinder 40, and the computer 158 will issue a command to the drive circuit 164 to operate the pump 115 to remove fluid from the master cylinder 40 and pump it to the waste tank 8.

The next procedure involves changing the brake fluid. The user will attach the adapter cap 67 (FIG. 5) to the master cylinder 40. The user will also connect one vacuum hose 24 to each of the bleeder valves 46 as shown, for example, in FIG. 3. Pressing the F2 pad or the F3 pad will initiate production of a message on the display 180 such as "read hydraulic fluid bar code-hit reset to abort." At that point, the user will scan indicia 72 on a container 70 at the reader 16 and receive a message such as "not approved—try again" or "call for service" or "insert appropriate EBB DOT brake fluid canister-press start."

Figure 5:
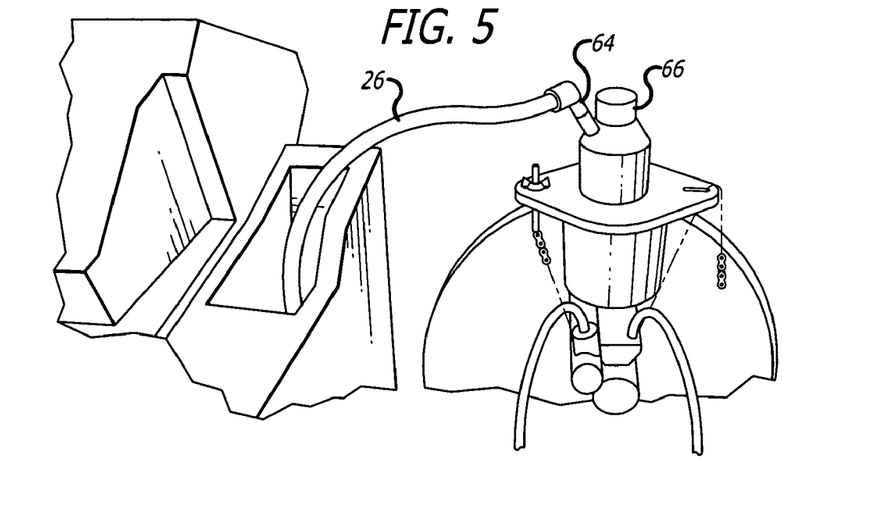
FIG. 5 is a partial, view similar to FIG. 2 apparatus including a hydraulic fluid supply line connected to an adapter on the hydraulic fluid reservoir in the vehicle.

If approved, the container 70 is then put in place as illustrated in FIG. 8. Depressing the F2 pad will initiate the "MC fill" operation and operate the pump 110 to fill the master cylinder 40. If pump priming is necessary, the operator will initiate the utility routines by depressing the F4 pad. As described above, this will enable the F1 pad for exhausting waste and the F2 pad for system prime. For system prime, hoses are connected as indicated in FIG. 4. The system senses, when the master cylinder 40 has been filled, for example, as by sensing pressure due to closing of the float switch 66 (FIG. 5).

Depression of the F3 pad initiates the fluid exchange operation in which old fluid is flushed out and new fluid is pumped into the brake lines of the vehicle 42 from the master cylinder 40. The computer 158 issues command signals to the driver circuit 164 to operate the pump 110 to provide surging pressure at the input and pump 115 to provide a vacuum in the drain lines 24. In a nominal embodiment, the system 1 moves approximately one pint of brake fluid per minute through the brake system. Preferably, the program includes a time out so that the pumps 115 and 110 will shut off automatically within a predetermined time, such as four minutes. Bleeder valves 46 (FIG. 3) may be closed during operations other than fluid exchange to eliminate possible back-checking of air. This may also insure that bleeding has been accomplished. Surging pressure is then relieved for safety. The adapter 67 may be removed from the master cylinder 40 and the hydraulic fluid system servicing is complete.

In a preferred form, the waste tank 8 will hold approximately 18 gallons. An alarm may sound when the tank is full triggered by any well-known form of sensor. An operator may press the F4 pad followed by the F1 pad to pump out waste. The waste hose 102 is connected to the fitting 100 (FIG. 9) for connecting waste fluid to a proper waste container 105.

Specific system pressures and durations of various functions called by the various commands described above are each settable by providing information to the computer 158. For example, the keyboard 160 may be used to provide such information. Another alarm may advise the operator when the container 70 is nearing empty.

The disclosure will enable those skilled in the art to make many modifications in the specific embodiments discussed while providing a method and apparatus in accordance with the present invention.

What is claimed is:

1. A fluid flushing system comprising:
   an indicia reader adapted to read indicia on a fluid container; and
   a data processor coupled to the indicia reader to determine if the indicia has been utilized before in the fluid flushing system.

2. The fluid flushing system of claim 1 further comprising a pump adapted to pump fluid from the fluid container, wherein the data processor is further coupled to the pump and prevents operation of the pump if the indicia has been utilized before in the fluid flushing system.

3. The fluid flushing system of claim 1 wherein the data processor requires reading an indicia that has not been utilized before in the fluid flushing system prior to initiating a fluid flushing operation.

4. The fluid flushing system of claim 1 further comprising an input device that indicates a type of vehicle being serviced, wherein the data processor further determines if the indicia indicates the proper grade of fluid for the type of vehicle being serviced.

5. The fluid flushing system of claim 4 further comprising a pump adapted to pump fluid from the fluid container, wherein the data processor is further coupled to the pump and prevents operation of the pump if the indicia does not indicate the proper grade of fluid for the type of vehicle being serviced.

6. The fluid flushing system of claim 4 wherein the data processor requires input of the type of vehicle being serviced and reading an indicia that indicates the proper grade of fluid for the type of vehicle being serviced prior to initiating a fluid flushing operation.

7. A method of fluid flushing comprising:
reading indicia on a fluid container; and
determining if the indicia has been utilized before in a fluid flushing system.

8. The method of fluid flushing of claim 7 further comprising preventing operation of a pump adapted to pump fluid from the fluid container if the indicia has been utilized before in the fluid flushing system.

9. The method of fluid flushing of claim 7 further comprising requiring an indicia that has not been utilized before in the fluid flushing system to be read prior to initiating a fluid flushing operation.

10. The method of fluid flushing of claim 7 further comprising:
receiving an input that indicates a type of vehicle being serviced; and
determining if the indicia indicates the proper grade of fluid for the type of vehicle being serviced.

11. The method of fluid flushing of claim 10 further comprising preventing operation of a pump adapted to pump fluid from the fluid container if the indicia does not indicate the proper grade of fluid for the type of vehicle being serviced.

12. The method of fluid flushing of claim 10 further comprising:
requiring input of the type of vehicle being serviced; and
requiring an indicia that indicates the proper grade of fluid for the type of vehicle being serviced to be read prior to initiating a fluid flushing operation.

13. A fluid flushing system comprising:
means for reading indicia on a fluid container; and
means for determining if the indicia has been utilized before in a fluid flushing system.

14. The fluid flushing system of claim 13 further comprising means for preventing operation of a pump adapted to pump fluid from the fluid container if the indicia has been utilized before in the fluid flushing system.

15. The fluid flushing system of claim 14 further comprising means for requiring an indicia that has not been utilized before in the fluid flushing system to be read prior to initiating a fluid flushing operation.

16. The fluid flushing system of claim 14 further comprising:
means for receiving an input that indicates a type of vehicle being serviced; and
means for determining if the indicia indicates the proper grade of fluid for the type of vehicle being serviced.

17. The fluid flushing system of claim 16 further comprising means for preventing operation of a pump adapted to pump fluid from the fluid container if the indicia does not indicate the proper grade of fluid for the type of vehicle being serviced.

18. The fluid flushing system of claim 16 further comprising:
means for requiring input of the type of vehicle being serviced; and
means for requiring an indicia that indicates the proper grade of fluid for the type of vehicle being serviced to be read prior to initiating a fluid flushing operation.

* * * * *